Figure 1:
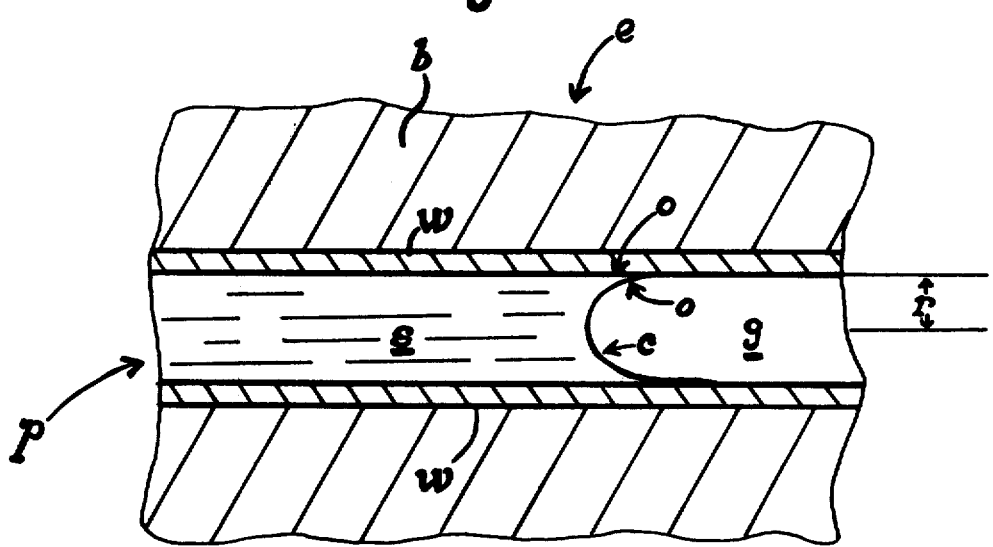

United States Patent [19]

McIntyre et al.

[11] 4,187,350

[45] Feb. 5, 1980

[54] POROUS CATALYZED ELECTRODE PROVISION AND TECHNIQUE

[75] Inventors: James A. McIntyre; Robert F. Phillips, both of Midland, Mich.

[73] Assignee: The Dow Chemical Company, Midland, Mich.

[21] Appl. No.: 939,594

[22] Filed: Sep. 5, 1978

[51] Int. Cl.² .................. H01M 4/90; C25B 11/03
[52] U.S. Cl. ................................ 429/45; 72/47; 204/98; 204/290 R; 204/290 F
[58] Field of Search .......... 429/45; 204/290 R, 290 F, 204/98; 72/47

[56] References Cited

U.S. PATENT DOCUMENTS

| | | | |
|---|---|---|---|
| 3,369,938 | 2/1965 | Kroeger et al. | 429/45 |
| 3,573,992 | 4/1971 | Grubb et al. | 204/290 F |
| 3,787,244 | 1/1974 | Schulmeister et al. | 427/115 |

FOREIGN PATENT DOCUMENTS 921111  2/1973  Canada .

OTHER PUBLICATIONS

Rybas et al., Trans. of Pri. Tek. Eksp. No. 6, pp. 121–123 11/12/73.

Primary Examiner—F. C. Edmundson

[57] ABSTRACT

A porous electrode, possessed of good physical qualities, containing size optimized electrocatalyst-bearing pores ensuring suitability for electrochemical reaction promotion, including the electroreduction of oxygen in alkaline media, is comprised of the compressed and compacted product of a pre-catalyzed, volumetrically reduced pre-form structure that, prior to densification, was characterizable in being laced with precursive interstitial passageways that are larger than electrode body pore size and which are comparably of a more open catalyst-applicating accessibility which passageways had been pre-provided on their wall surfaces with effective quantity deposits of catalytic agent.

22 Claims, 12 Drawing Figures

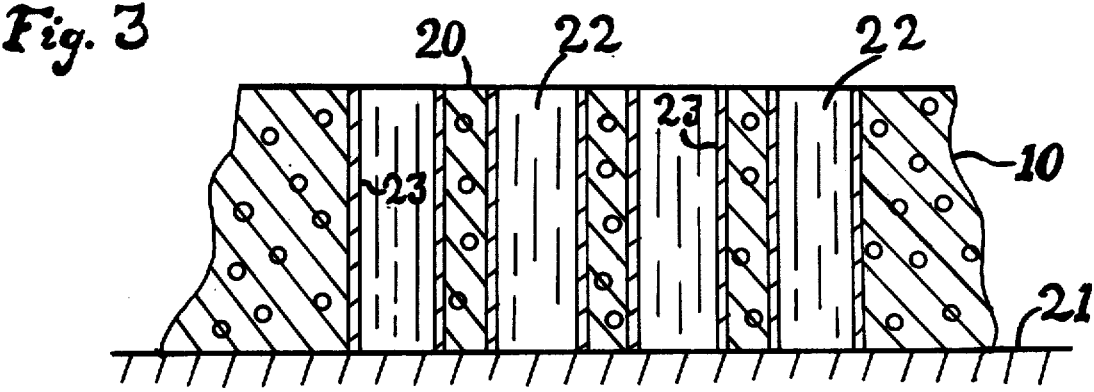
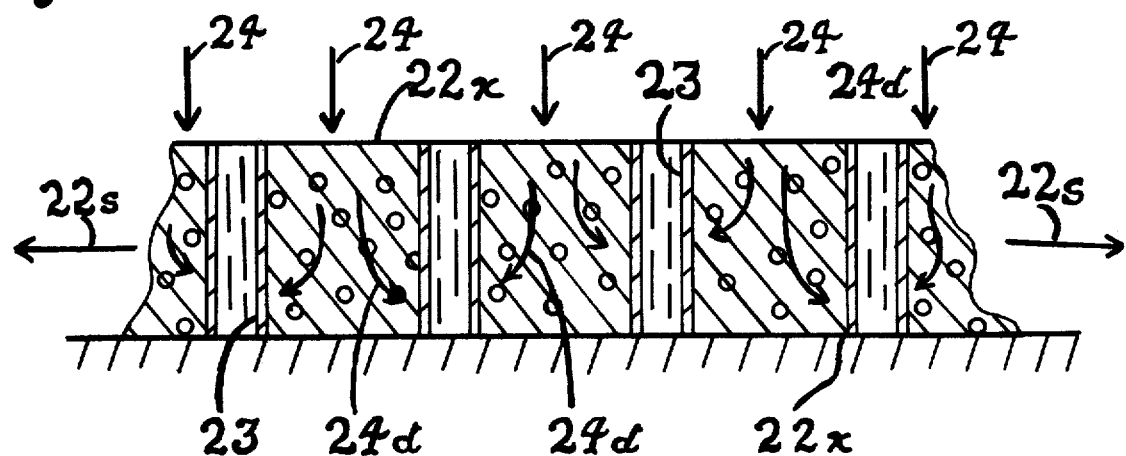
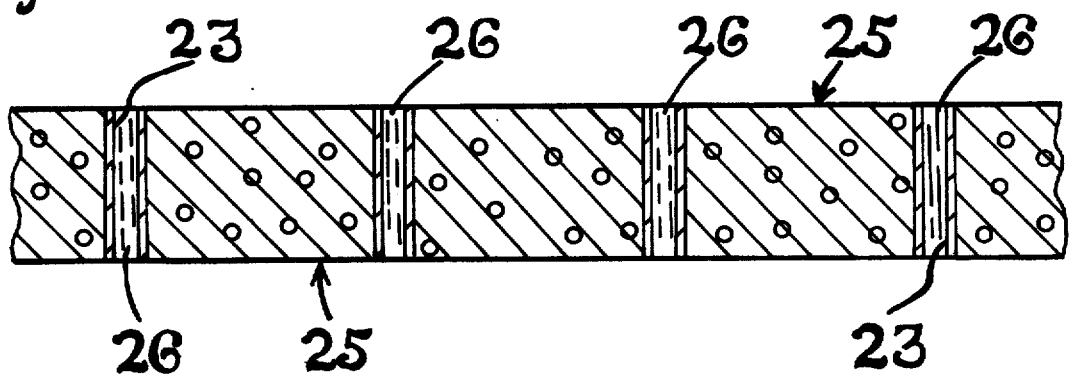

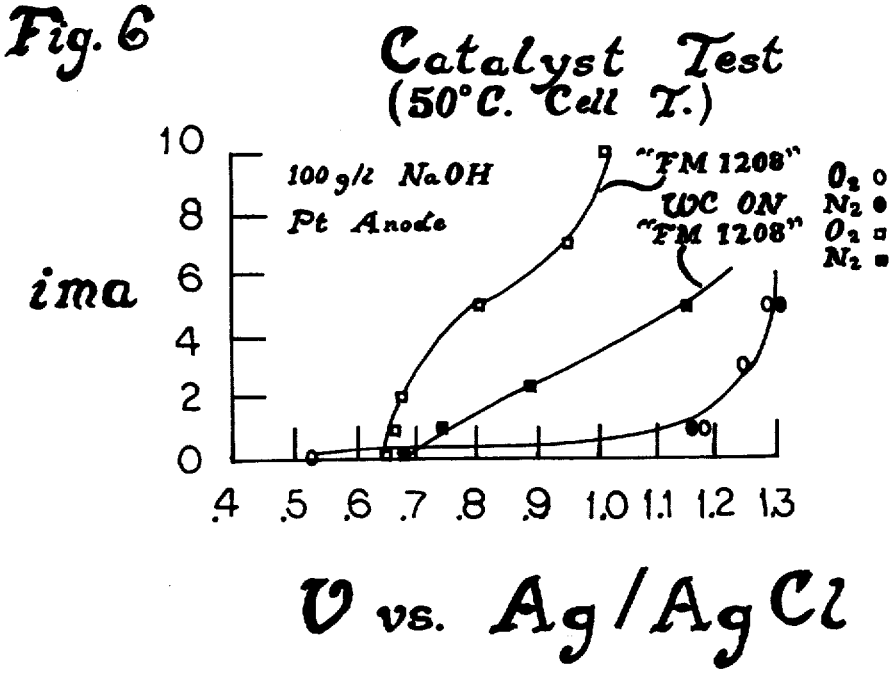
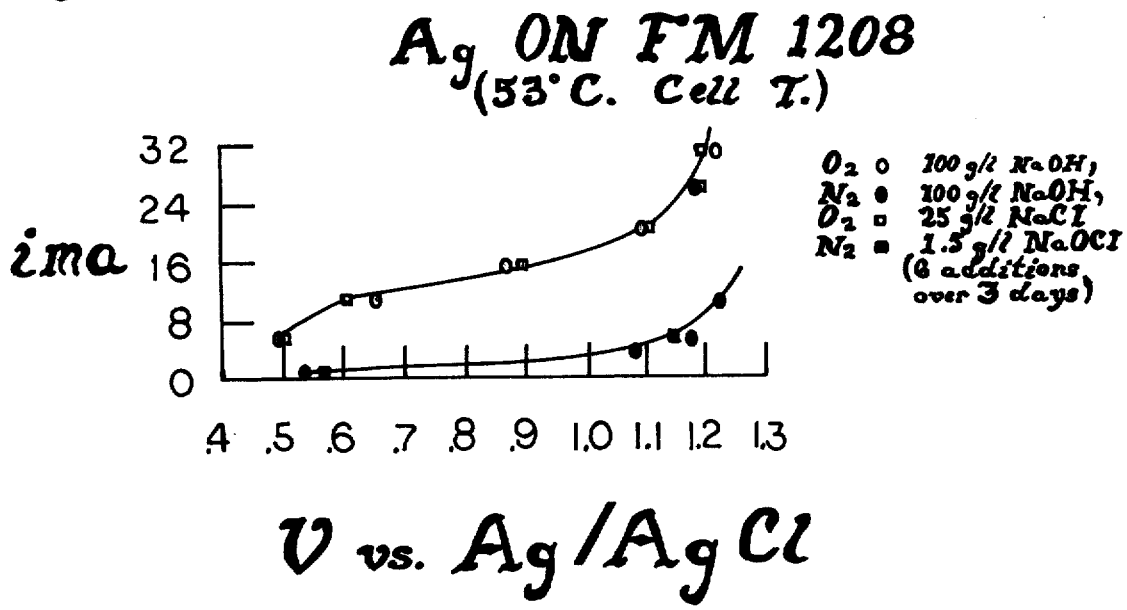

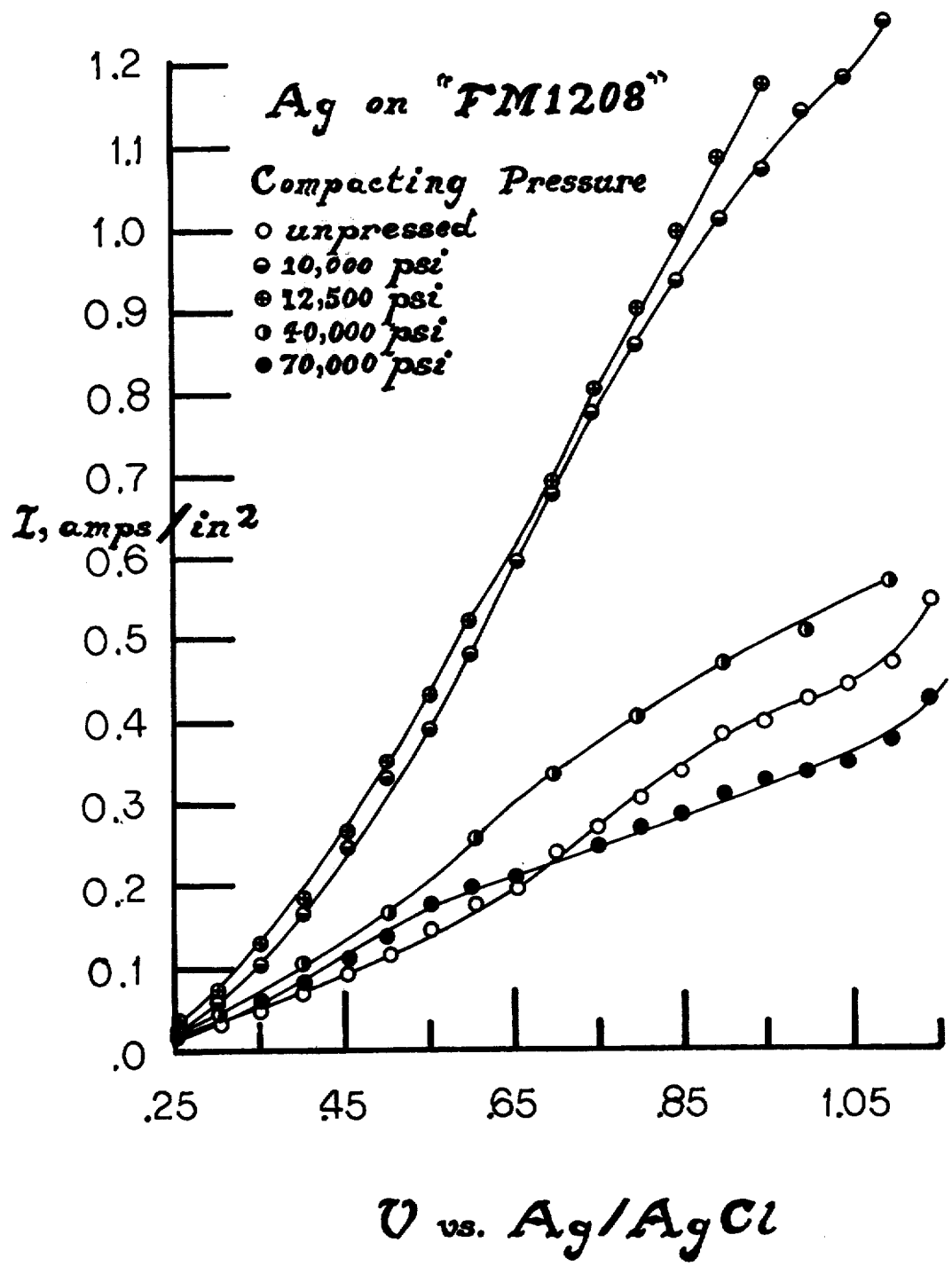

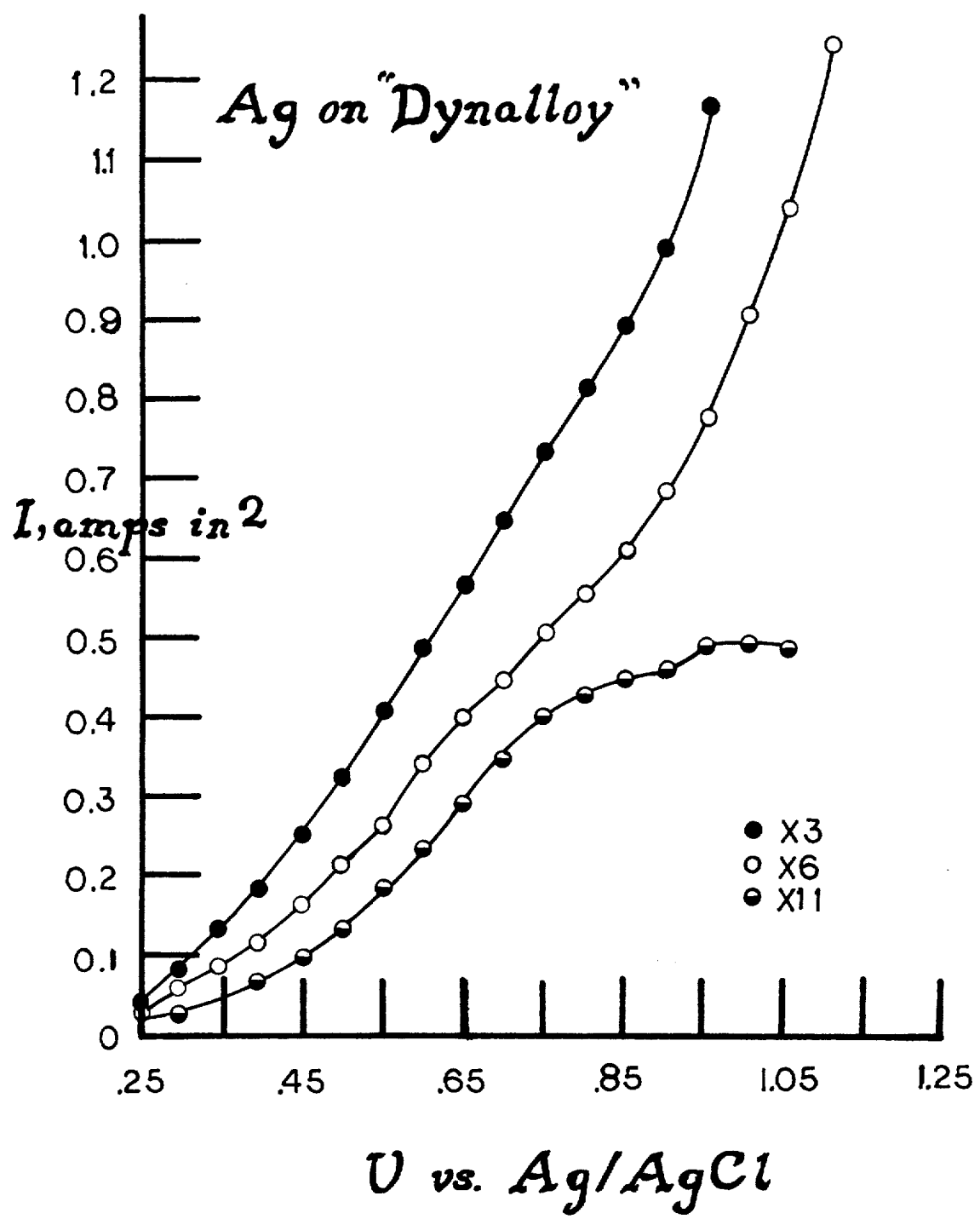

POROUS CATALYZED ELECTRODE PROVISION AND TECHNIQUE

BACKGROUND OF THE INVENTION

Gas electrodes, in and with which a gas is passed in contact with a suitable electrode conductor in the presence of an electrolyte solution, are well known. Many modern gas electrodes are made to be porous and to have catalytically-active surface areas. These include those wall surface areas of the pores disposed internally within the electrode body. In this way, there can be realized maximization of the available and effective surface area of the electrode for given unit geometric volumes of the electrode configuration.

Such general type and style of electrode construction is especially advantageous for the oxygen gas-bearing electrodes that are well adapted for the electroreduction of oxygen in alkaline media.

The usage technique applied with such electrodes often involves passage of the oxygen-bearing gas through the porous electrode body for contact with the involved electrolyte interstitially therewithin and/or at and on the electrolyte-contacting face or wall of the electrode body. The indicated practice is desirable for electrolyzing functions and, conversely as well, for operations in the galvanic mode as in fuel cells. Oxygen gas-bearing depolarized cathodes so made and operated are particularly attractive for utilization in chlor-alkali and the like or equivalent manufacturing cell operations.

A great and impelling reason (although other benefits also accrue) for employing oxygen gas-bearing, depolarized porous electrodes to electrolyze common salt brine into chlorine and caustic soda (i.e., NaOH) and for analogous production purposes, is pure and simple economics. Potentially very impressively significant savings in power requirements for given electrolysis workings are anticipatable due to substantial reductions achievable in needs for applied electrical potential when such electrodes are utilized. This is evident in comparison of operating voltage levels for the involved electrochemical reactions, taking into account that conventional cells already are usually operated at quite low voltages; the cathodic reactions (disregarding overvoltage effects) respectively being:

In traditionally common chlor-alkali cells:

$$2H_2O + 2e^- \rightarrow H_2 + 2OH^-, \quad (I)$$

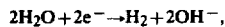

with $E° = -0.828$ volt; and
With the oxygen-gas depolarized cathodes:

$$O_2 + 2H_2O + 4e^- \rightarrow 4OH^-, \quad (II)$$

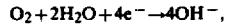

with $E° = 0.401$ volt;

there being a consequent theoretically attainable saving of 1.229 volts in the difference.

Literally from their inception and classically, oxygen electrodes have been catalyzed by various precious and semi-precious metals and compounds thereof, such as gold, osmium, palladium, platinum, silver and so forth, and their alloys, oxides and other compositions. These noble metals are not only in generally scarce supply for other than jewelry adornments and ornamentations and/or monetary purposes, but are inherently extremely expensive for industrial applications. Because of this, their consumption for electrode preparation is carefully controlled and extended to the greatest possible extent; this usually being done so as to minimize total quantity usage by deposition thereof in the form of platings or other applied layers or coatings over a suitable substrate, such as porous nickel plaque.

This last-mentioned possibility, at least superficially and ostensibly, would seem to have ensured the provision on an economically reasonable basis of reliable and effective porous electrodes that are optimumly electrocatalytically effective.

Surprisingly, however, the stated expectation is not the case. Satisfactory and effective pore depositions of precious and semi-precious mtals and their compounds and many other catalytic materials in porous electrode bodies is, nonetheless, not always easily or directly achievable; complex procedures and manipulations oftentimes being required for the purpose. Sometimes, in fact, the normal and ordinarily employed porous electrode bodies cannot be employed for such catalyzation; oftentimes requiring utilization of specially constructed and compositioned materials for their fabrication which may tend to actually be physically inferior as electrode units. In other instances they may even require special treatments or conditionings and particularized applicating procedures to possibilitate or enhance catalyst deposition.

To illustrate a commonly encountered difficulty along the above-mentioned lines, the most desirable range of average nominal pore size in electrode bodies in order to most effectively facilitate electrochemical reactions is generally from 1 (or sometimes even less) or so to about, say, 12 microns. This, for reasons hereinafter better explained, is especially so in connection with gas diffusion electrodes with which it appears and is believed to be most advantageous to effectuate the reaction interiorly within the porous body structure. In attempting by ordinary procedures to electroplate a precious or semi-precious metal catalyst within and on the enclosed wall surface(s) of such porules, it is frequently and on those occasions disadvantageously found that most of the metal catalyst tends to unavoidably be deposited on the external face wall of the electrode body. To avoid such frustrating ineffectualities, sophisticated and complex techniques have been developed including such strategems as pumping plating solution through the porous metal substrate as disclosed in U.S. Pat. No. 3,787,244 and Canadian Pat. No. 921,111. Analogous problems of pore blockage and inefficient and/or misplaced catalyst deposition are similarly encountered when attempting to coat or layer other electrocatalytic agents within such finely-pored electrode bodies.

It would obviously be desirable to easily and readily have some reliable and relatively problem-free way to catalyze and so provide the interior pore wall surfaces of very fine pore structured electrode bodies, especially when very costly platings of gold, palladium, platinum, silver and the like are involved and to have such catalyzed electrode products for superior performance in electrochemical reactions.

DISSERTATION APPROPOS TO THE INVENTION

To better comprehend the advantageous effects and implications towards desirable possibilities realizable in practice of the present invention, it is worthwhile to consider in more than casual depth the actual manner in which gas electrodes operate and the consequences attributable to same.

Figure 2:
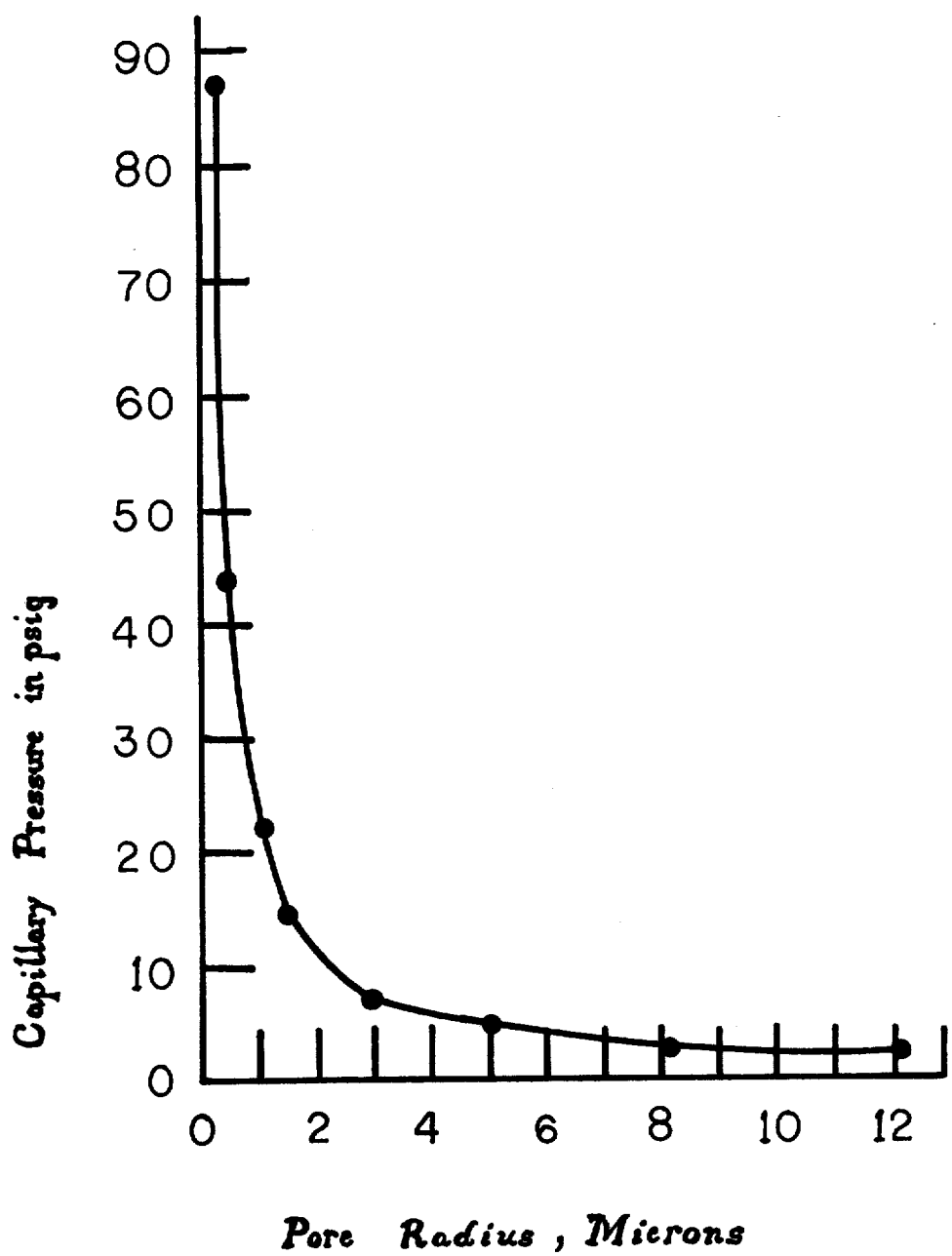

For this, early resort to certain of the FIGURES in the accompanying Drawing is appropriate and now made. These are: FIG. 1, which is a fanciful, schematic, cross-sectional view of an idealized pore, partially filled by an electrolyte as is the frequently preferred way to have it run, in the body of a porous gas electrode; FIG. 2 which is by way of a graphical portrayal to present a view of a curve plotting, for given conditions during electrode operation the capillary pressures generated in internal pores of varying (nominal) radii; and FIG. 12, which graphically sets forth some of the results obtained from the experimentation of the Third Example included in the "EXEMPLIFICATION . . . " hereof.

To further explain FIG. 1, an idealized pore "p" is situate in a portion of the body "b" of a gas electrode which is identified generally by reference letter "e". From this, the pore-enclosing portion of body "b" is broken out. The pore "p" has a purposely exaggerated interior wall "w" which locates the internal surface area of the pore. Electrolyte solution "s" enters from one end of the pore, while the (generally oxygen-bearing) gas "g" penetrates from the opposite end. The interface boundary of fluid contact between electrolyte and gas is generally designated by the letter "c", with the contact angle $\theta$ measured between the angle-delineating arrows from the pore wall to the boundary interface in the meniscus at point of liquid contact. The radius "r" of the pore is also illustrated.

Bearing in mind the electrochemical reaction of the above Equation (I), it is evident that in order for reaction to proceed, oxygen must diffuse through the electrolyte to the surface, whereupon it is adsorbed (abbreviated "ads") and probably reacts according to:

$(O_2)_{ads} + e \rightarrow (O_2^-)_{ads};$  (III)

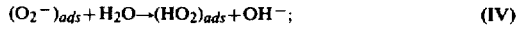
$(O_2^-)_{ads} + H_2O \rightarrow (HO_2)_{ads} + OH^-;$  (IV)

$(HO_2)_{ads} + e \rightarrow (HO_2^-)_{ads};$ and  (V)

$2(HO_2^-)_{ads} \rightarrow 2OH^- + O_2,$  (VI)

with the oxygen produced per Equation (VI) also reacting according to this scheme. Support for this is already proposed in both: (a) "*Electrochemical Processes In Fuel Cells*" by M. W. Breiter (Springer-Verlag, N.Y., 1969); and (b) "*The Electrochemistry Of Oxygen*" by G. P. Hoare (Interscience Publishers, N.Y., 1968). Presumably most of the reaction occurs in the thin film region, where the path length for oxygen transport is shortest.

As each $OH^-$ ion is produced, there must be a net transport of it out of the pore and, together with this movement, transport of more water into the pore. Thus, the rate-limiting step for the overall electrode reaction may involve either of the electrolyte or oxygen mass transfer steps, or any of the steps in the surface electrochemical reduction sequence. The reaction of Equation (III), which involves electron transfer to $(O_2)_{ads}$, is normally considered to be the slow step of the reduction sequence (looking again, for this, to Reference (b) above).

In any electrochemical reaction proceeding at an electrode at a finite rate, the potential differs from the equilibrium potential i.e., the potential calculated from the free energy of the reaction and the known and established Nernst Equation. This difference is known as the overvoltage, $\eta$. It is comprised of contributions from the energy required for the electrochemical reaction $\eta_a$, the changing concentrations of the active species, $\eta_c$, and the potential loss which occurs whenever a current passes through a resistor, $\eta_o$. Note that $\theta_c$ follows from the Nernst Equation (i.e., as the concentration of active species at the electrode surface changes due to reaction) the equilibrium potential changes. Thus, concentration overvoltage exists only because the concentration reference point for which one calculates the equilibrium potential (or measures it, at zero current flow) is the bulk solution, rather than the actual concentration (or activity, strictly speaking) of the reacting species at the electrode surface.

From the above it follows that:

$$\eta_t = \eta_a + \eta_c + \eta_o. \tag{VII}$$

In practices utilizing relatively very low current densities, say those on an order less than about 1.0 amp/in$^2$ with typical electrolyte concentration of about 2.5 M, it is unlikely that electrolyte mass transfer would be rate limiting; this not being taken to mean that $\eta_c$ is zero.

Practical application can be made of the indicated relationship of the overvoltage components in a cell operating with an oxygen depolarized electrode to determine some of the components of the overvoltage. As an illustration, anode overvoltage and solution resistance losses will remain at least substantially constant whether oxygen or nitrogen is being fed to the cathode for and in any given set of fixed operating conditions including current density, temperature, electrolyte composition and so forth.

Thus, by measuring the cell voltage on oxygen (or air) and nitrogen and then subtracting, one effectively corrects for: all the anodic overvoltage; the electrolyte concentration overvoltage; and the cell ohmic overvoltage at each current density. This procedure eliminates the need for using reference electrodes or interrupter techniques for correcting for $\eta_o$. In effect, then, "depolarizations" or depolarization values are actually a measure of the activation overvoltage and the oxygen concentration overvoltage at the cathode. In this connection, it is clear that one of these must be rate controlling, taking into account that a decreasing depolarization is equivalent to an increasing overvoltage.

The use of large electrodes and concentrated, well-stirred solutions at reasonably low current densities normally eliminates much of the concentration overvoltage. However, in gas diffusion electrodes, dissolution and diffusion of the gas can be sufficiently slow so as to give rise to undesirably and often detestably large overvoltages. This overvoltage can be reduced by increasing the gas pressure which increases the mass transfer rate.

Referring back to FIG. 12, it is apparent therein that above a flow rate of 28 ml/min or so, the overvoltage (effectively meaning "depolarization") becomes insensitive to increasing flow rate (and, ergo, pressure). In this and by reason of explaining why a pressure insensitivity also of the overvoltage comes into play, it must be taken into account that the porous electrode operates upon and with gas passage therethrough so that, in consequence, higher gas pressures are required to maintain higher flow rates. The amount of oxygen required to satisfy Equation (I) for a cell running at 1.5 amps is approximately 6 ml/minute. At the lower flow rate of 14 ml/minute, enough oxygen is present, but the pressure is too low to transport it to the surface at an adequate rate to reduce the overvoltage.

Increasing the gas pressure does have another effect in addition to improved oxygen mass transfer. For good electrode performance, it is desirable to maximize the liquid-gas interfacial area within the electrode structure. Capillary action will tend to fill the pores with liquid, while gas pressure will tend to fill the pores with gas. It is in the partially gas, partially liquid, filled pores that most of the reaction is believed to take place.

Looking again at FIG. 1, the pressure of a liquid in a capillary can be calculated from:

$$P = (-2\gamma_{l,v} \cos \theta / r) \times 9.87 \times 10^{-7}, \quad \text{(VIII)}$$

wherein

P is the capillary pressure in atmospheres;
$\gamma$ is the surface tension in dynes/cm;
$\theta$ is the contact angle; and
r is the pore radius in microns.

These pressures can become quite large for the small pores found in these electrodes, as is evidenced in the graphical presentation of FIG. 2 of the drawing (for the preparation of which, the calculation was made using a value of 75 dyne/cm for the surface tension and 0° for the contact angle.)

In a real electrode, the actual pore diameters—and thus the liquid pressure—will vary. Thus, for any gas pressure (since this will be uniform across the electrode), the range may be from pores totally filled with liquid to pores totally filled with gas. Obviously these extremes contribute little to current flow. It is accordingly desirable to have a narrow pore size distribution in order to produce as many partially filled pores as possible. There are other known means to help achieve this (which could find actual associated application for purposes of the present consideration), such as use of dual porosity electrodes and wetproofing of pores. If the gas pressure is increased, the liquid is obviously and as it were "pushed-back" toward the electrolyte side of the electrode. This causes some of the pores that may be flooded (i.e., filled with electrolyte) to be partially emptied, thus allowing reaction to take place. But it also causes some pores to be totally emptied, whereby no reaction, or at least none to any large extent, takes place. Thus, for any given pore size distribution, a gas pressure exists for which a maximum number of pores are in the partly filled condition. At higher pressures, more and more pores would be emptied of electrolyte, and one would suspect that the overvoltage should start to rise. This, for purposes of the present invention, is ignored for sake of preferred operation in a region of gas pressures where mass transfer is the dominant, but not rate controlling gas pressure effect.

From the foregoing, then, it must be concluded that the reaction is activation controlled at any given attractive current density (as, for illustrative purposes, 0.5 amp/in$^2$). This result indicates that, in order to attain desirable and economically advantageous relatively high depolarized voltage values for the electrode at given attractive current densities, it is for all intents and purposes necessary to use higher surface area electrodes or alternatively, a better catalyst implementation.

Utilization and proficient employment of very efficient electrocatalyzing agents are obvious means of achieving the indicated desiderata and assuring high-confidence of good performance expectabilities in given installations. Quite obviously, this can also be materially bolstered and even better effectuated by using electrodes having maximized catalytically-active surface areas therein. Such highly preferred results, within practical limitations of space and apparatus confines, are attainable by employment of electrode body constructions having very finely sized and literally miniscule pore structures and dispositions in great relative abundance therein.

However, as noted, the simultaneous achievement of these ends is oftentimes difficult and vexatious. Good catalysts (especially the precious metal variety) are very expensive and must be sparingly used for purposes of realistic cost control if any economic sense is to be made by their utilization; and to effectively place them well in minutely porous electrode bodies is neither an easy nor uncomplicated task when attempted in known ways. The urgency and criticality of having optimized desiderations becomes increasingly apparent when proper consideration is made with due attention to the expressed criteria of the fact that the attractively low current density ranges in which electrochemical reactions and their control are wanted must be promoted and done with electrodes having relatively low and restrictively finite involved exposed surface or planar geometrical wall or face areas through which the current must proceed.

Reduced to its meaning for purposes of most satisfactory performance, true current density based on actual involved surface area can be astonishingly low. This bears actual relationship to the fact that the exchange current density is so low that only by the use of high internal surface area electrodes can reasonable geometric current densities be obtained at practical overvoltages. Thus, if one doubles the catalyzed surface area for reaction in a given volume of porous electrode, there can be achieved the same total geometric current density while halving the exposed surface area current density, which reduces the overvoltage.

FIELD AND OBJECTIVES OF THE INVENTION

The present invention relates generally to electrochemistry and is more particularly relevant to an improved and effective, simple and straightforward way and means of getting and having effective deposits or placements, especially metal platings, of various electrocatalytically-active materials and substances (particularly including those catalytic agents that are conducive to electroreduction of oxygen in alkaline media for electrolysis and galvanic mode operations and installations such, especially, as the various precious and semi-precious metals) within the porules of porous electrode bodies and on the enclosed pore-wall surface areas thereof, along with the resultant optimumly catalyzed and reliably high performance, very-finely-sized porous electrode bodies obtained, all this and in broadly stated terms being accomplished by: taking or starting with a pre-formed porous body of suitable ductile and compressible substrate material having therein interstitial passageways that are in fact and function precursors of the ultimate porules obtained and which passageways are of a relatively larger size with greater openness accessibility than that desired and gotten in the miniscule pores of the finished electrode body; (which is only optionally done in the event the substrate is inherently sufficiently catalytic in nature) depositing, as by electroplating, an electrocatalytically active coating or layer in appropriate effective quantities on the interior wall surfaces of said interstitial passageways; then physically compressing and reducing the volume of said preformed body to reduce the catalyst-bearing pores to a fixed, ultimate average nominal dimension and most beneficially narrowed pore size distribution in the wanted and most electrochemically useful and advantageously operable pore size range. As revelation thereof permits it to be easily seen, practice of the present invention allows catalyst deposition to be most expeditiously and conveniently done within the larger volumed working spaces of the precursor interstitial passageways of the preformed porous body so that more uniform and effectively conservative usage of catalytic agent may be realized and better coating or layering applications made while, at the same time, finally getting a quality catalyzed porous electrode body product of excellent critical pore arrangement, distribution and finely-sized characteristics qualities. This is particularly significant with respect to electroplating operations wherein facile plating solution movement within stringent spatial confinements must be had to get as nearly ideal as possible depositions for not only utmost ecomony of deposited catalyst consumption but best attainable deposit evenness and placement within and throughout the passageway. High confidence levels of anticipatable good performance generally attach to catalyzed electrode bodies fabricated pursuant to the instant development. The provision and use of such electrode making technique and procedure and products thereof are amongst the principal aims and objectives of the present invention.

SUMMARY OF THE INVENTION

The instant contribution to the art contemplates and is directed to a technique for the fabrication of a catalyzed porous electrode body that is copiously laced with a great multiplicity of body-traversing, internal pores having fine size pore measurements on the order of average nominal diameter or equivalent measure between about 0.1 and about 12 microns and a porosity of between about 30 and about 90 volume percent, based on the percentage of porulous void space in the total volume of the electrode body, said technique comprising taking as a pre-form a porous body of ductile, compressible, electroconductive material of construction having therein a plurality of interstitial precursor passageways that have a nominal average passageway diameter or equivalent measure greater than about 12 microns; then subjecting said pre-form to pressure adequate to densify same and reduce the size of said precursor passageways to an average nominal diameter or equivalent measure that is less than about 12 microns.

The invention is also pertinent to the advantageous, fine pore-sized, catalyzed porous electrode bodies obtained in and from its practice; each being a catalyzed porous electrode body having a structure comprising: an electroconductive material of construction shaped into electrode body form; said electrode body form containing a great multiplicity of fine pores traversing said body that have an average nominal diameter size or equivalent measure of between about 0.1 and about 12 microns; said electrode body form also having a porosity of between about 30 and about 90 volume percent, based on the volume of porulous void space in the total volume of the electrode body; said body being further characterizable as the physically compressed and densified remains of a porous pre-form of a preliminary body of the same material of construction copiously laced with interstitial passageways that were precursors of said fine pores and which had an average nominal diameter or equivalent measure in excess of about 12 microns.

Non-limiting proportional details, including catalyzation particulars, and other pertinent specifics of the invention are hereinafter more ingenously and exactly set forth.

ILLUSTRATED REPRESENTATION OF THE INVENTION

Figure 12:
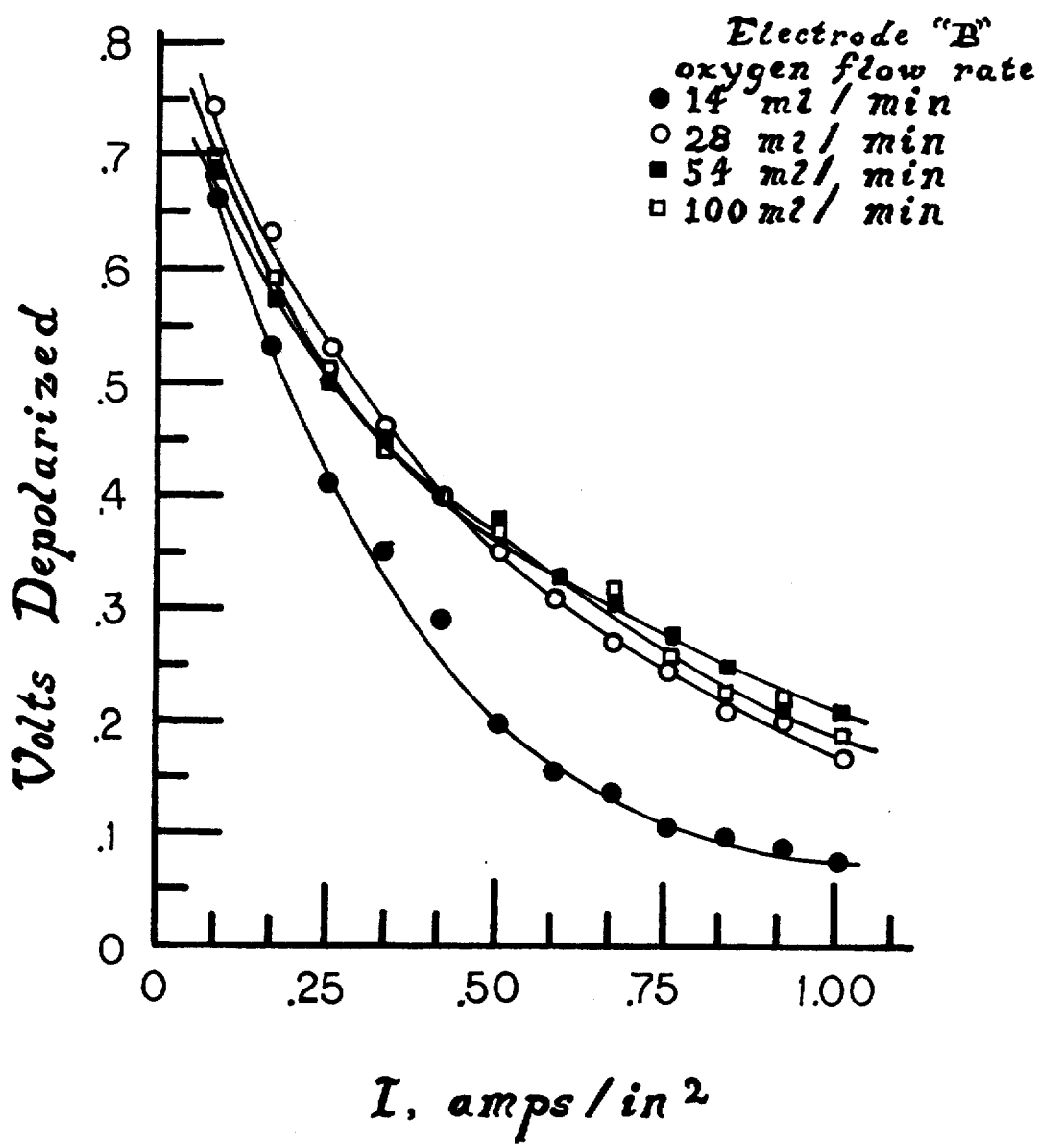

Further features and characteristics of the porous electrode body fabricating development in accordance with the present invention, and the way in which it so nicely achieves and fulfills the presently-intended aims and objectives and contributes to the art for which it is pertinent, are more readily apparent and evident in the ensuing specification and description, taken in conjunction with the accompanying drawing, wherein:

FIGS. 1, 2 and 12 are as explained in the foregoing;

FIGS. 3, 4 and 5 are related, sequential action-illustrating, in exaggerated, broken away cross-sectional elevation views, which schematically and in a most simplified manner illustrate what happens from the pre-form to final finished electrode body stages in the carrying out the invention; and FIGS. 6–11, inclusive, are additional graphical presentations plotting out the results of experimentations conducted either explanatorily relative or pursuant to the invention.

PARTICULARIZED DESCRIPTION OF THE INVENTION

According to practice of the present invention and the founding discovery of its genesis, a very effective means of fabricating and providing catalyzed porous electrode bodies is, simply stated, by mechanically pressing in any effective and desired way with apparatus means adapted to the purpose of porous, pre-formed (usually metallic) substrate having relatively large interstitial passageways provided or formed therein so as, upon compression and compaction of the pre-form, to reduce the passageways in size to that desired for the fine pores in the porous electrode body product. The described technique has a very practical advantage for purposes of the present invention; this being in that it is easier to electroplate or otherwise apply coating layers and deposits in the interior surfaces of large passageways as compared to small pores. Pressing a plated or otherwise catalytically deposited porous electrode reduces the pore size to a range which results in better electrochemical performance. As hereinafter shown, there is an optimum pressure range to be used for a given starting pore size. At low pressures, the pore size is oftentimes not reduced enough in order to obtain good performance. At high pressures, performances may again tend to deteriorate, due to possible collapse and blockage of too many of the precursor interstitial passageways in the pre-form in the process of attempting to reduce them to extremely fine finished pore sizes.

Reference is now had to FIGS. 3–5 of the Drawing. These show, in fabricating sequence illustrations, the mechanical fabrication of a porous electrode body all in accordance with the present invention. In FIG. 3 there is shown a pre-form, identified by the reference numeral 20 having therein a great plurality of relatively large and open interstitial passageways 22. For convenience and as a matter of possible choice, the pre-form is depicted as if resting on a support ground or surface 21.

The interstitial passageways 22 in the pre-form 20 have been pre-catalyzed on their interior wall surfaces whereupon there is provided an adequate quantity of a deposit 23, advantageously in layer or coating form, such as an applied electroplated layer 23 of silver or like or equivalent precious or semi-precious metal. The catalyst loading level may be varied to accommodate various needs and situations, as hereinafter more fully explained. In general, however, catalyst deposit layer 23 should be as thin and uniform as possible.

As is hereinafter more fully brought forth, it must be recognized that the illustration of the pore structures made in FIGS. 3–5 of the drawing is idealized. In fact and actual embodiment, they are generally not in such regular and perfect alignment as is depicted in these mentioned views which are employed only for simplified explanatory purposes.

FIG. 4, as in a stop-motion depiction, illustrates an intermediate stage in one sort of procedure for the fabrication. As indicated, a pressing force applied by means not shown is in the process of compacting and/or squeezing down the pre-form which, in its intermediate stage of densifying volumetric reduction, is designated by reference numeral 22x. The applied compacting force is fancifully portrayed by the arrows 24 demonstrating the application of pressure on the upper flat surface across the width of the pre-form. The force is internally distributed within and throughout the pre-form in the internal motional directions suggested by the arrows 24f so as to not only cause its compression but to squeeze down and constrict, as it were, the average size and cross-sectional area opening and diameter of the interstitial passageways 22. During this, the catalyst deposit layer 23 in each passageway remains intact, although perforce tending to somewhat attenuate during narrowing size-reduction and probably unavoidable passageway elongation in the compacting procedure.

There are several suitable mechanical ways to accomplish the pre-form pressing. One is to simply compact the unconfined pre-form under a ram or hammer to the desired suitable point of volume reduction or, alternatively and oftentimes with great advantage, to accomplish the densifying squeeze-down by typical sheet and strip-metal sorts of rolling mill stands and arrangements, using as many passes of the pre-form sheet under appropriate pressure(s) applied by the roll bight or nip per pass as necessary for the purpose. When the pressing is in either way so done, the pre-form tends to spread laterally under the applied compacting force, as indicated by the directional arrows 22s in FIG. 4. Of course, cutting or trimming to desired size of the pressed electrode body material is done when the pre-form stock is larger than necessary for the size to be had in a finished electrode body.

Alternatively, if desired, the pre-form may be pressed down within the limits of a completely (from the outset) or partially (as affecting physical shape restraint only during or near finishing of the press) limiting die or mold chamber in which to contain the preform during its compaction. Also alternatively although usually not preferentially, the preform may be compacted by application of pressure in lateral edge side-to-side and/or lateral top-to-bottom fashion (acting against the smaller exposed surface walls) with appropriate care taken and means provided to avoid undesired warping or buckling of the body being pressed. In this connection, it is as a further alternative also possible to press the preform by application of both face-to-face and lateral compacting pressure; this being possible by use of a suitable compressing die arrangement or series of same or by forcefully passing sheet-like lengths through shaping die means or roller sets with associated edge confining or constricting means.

In any event, the working of the pre-form is usually satisfactorily accomplished cold, although in some cases hot working techniques can be employed, as is readily determinable by those skilled in the art in order to better obtain desired results.

The reduced volume of the preform is in some fashion and to some measure proportional to applied pressure of compaction, being less direct when spreading is permitted during the squeeze. In most cases,, however, the volumetric reduction of the pre-catalyzed pre-form is, without limitation, desirably on the order of between about 20 and about 70, advantageously from about 30 to about 60, percent of volume reduction, based on original volume of the pre-form. Expressed in somewhat correlative (albeit not precisely proportional) terms—the compaction of the pre-form to final porous electrode body semblance taken from the vantage of thickness reduction from major face-to-face compacting action—is broadly on about the same order of magnitude (i.e., 20–70%) as that for volume and, with frequently greater advantage, somewhere between about 30 and 60 percent by measure in thickness, based upon original thickness of the pre-form.

The latter analytical indicia is nicely illustrated in the following tabulation setting forth thickness reductions in a porous pre-form under various applied pressures, starting with what were porous nickel bodies of sintered metal fibrous particles (commercially obtained from BRUNSWICK METAL, INC. as "Feltmetal-FM 1208" having a thickness of 46 mils (ca. 0.117 centimeter) with an apparent density of 40 percent of theoretical and containing interstitial passageways having, for the particularly involved goods, a mean nominal diameter of 21 microns; the working having been done cold under a simple hydraulic ram press with no edge confinement of the pre-form bodies:

TABLE

Thickness Reduction Of Porous Nickel Pre-Forms Under Various Pressure Applications

| Applied Pressure in Thousands of psi* | Resulting Thickness | | Thickness Reduction % | |
|---|---|---|---|---|
| | Mils | Centimeters | Of Original | Direct, As Such |
| 18 | 32 | 0.813 | 69.6 | 30.4 |
| 72 | 25 | 0.635 | 54.3 | 45.7 |
| 120 | 22 | 0.559 | 47.8 | 52.2 |
| 199 | 20 | 0.508 | 43.5 | 56.5 |
| 271 | 19 | 0.483 | 41.3 | 58.7 |

*1 psi ≈ 0.704 gm/cm$^2$.

In any event, the finally pressed and obtained, completely size-reduced, catalyzed porous electrode body is shown in FIG. 5 of the drawing wherein it is generally designated by reference numeral 25. Electrode body 25 contains the multiplicity of desired catalyst-bearing, very finely sized and literally relatively infinitesimal porules 26 that are excellently adapted to electrochemical applications and purposes.

The appropriately fine pore-sized electrodes obtained by practice of the present invention, as indicated, have very desirable operating characteristics especially when utilized as gas electrodes as upon employment in an oxygen gas-bearing depolarized cathode in chlor-alkali producing cells. In such service, they tend very positively and advantageously to avoid gas leakage when the electrode is stationed as a wall between and in order to separate an electrolyte and the gas supply being fed thereto and handled under pressure; also exhibiting great propensity to maintain the occurrence of the desired electrochemical reaction on the catalyzed pore surfaces interiorly within the electrode.

In this connection, it is generally preferable for the average nominal interstitial passageway size in the pre-form body to be relatively large and coarse to best facilitate pre-catalyzation, especially by plating procedures or with other liquid deposition or coating manipulations from liquid procedures. These should generally be of a size that is at least of about a 12 micron diameter or other equivalent measure; it generally being more desirable for the starting interstitial passageway dimension to be greater than about 20 microns and sometimes even preferable when it is on the order of from about 50 to about 100 or even more microns.

The appropriate average pore size rendered in the porous electrode bodies fabricated and obtained by practice of the present invention depends in final requirements, as will be appreciated by those skilled in the art, upon the particular use application to be made thereof. Usually and pragmatically, porous electrode bodies having nominal average pore size diameters in the range of from about 0.1 to about 12 or so mircons are adaptable to a wide variety of electrochemical utilizations. It may often be more advantageous to have this range in numerical size limitation between about 1 and 9 microns, with it sometimes being preferable to have it fall in an appropriate 3-8 micron average nominal diameter span.

Further along this line, it must also be taken into account that, in their truly existant procedure through the body in which they are contained (the same applying to both the interstitial passageways in the pre-form and the finally-obtained fine pores in the porous electrode body product gotten by pre-form pressing), the interstitial passageways ordinarily have individually and complexly varying sinuous or serpentine, winding and frequently coiled or corkscrew-like (in either relatively regular and/or diversely volute) fashion, possibly even thick and thin cross-sectional, commonly indirect and/or indefinite and frequently forked or branch-tunneled sorts of pattern routes or path followings. The multiplicity of possibly even diversely sized precursor interstice and resulting porule openings usually individually assume some such geometry in their almost invariably meandering style of traverse of the part of the porous body structure in which they are separately situate. The individual pore lengths are seldom of the same actual path length as the direct thickness of the body being penetrated, generally tending to be much longer than that thickness itself.

Thus, the precursor interstitial passageways are inherently well adapted to be precatalyzed then cross-sectionally compressed and restricted without intolerable deleterious effect on the applied catalyst deposit to provide, without substantial or significant break or collapse, the resultant catalyzed porules as they appear in the porous electrode body product. In this and as has been mentioned, care sould be taken in the pre-form pressing to avoid use of so much pressure as might cause excessive or even total densification of the substrate bringing about undesirable interfering blockages in or, by way of reducing them to a literal vanishing point, excessive or even complete collapse of the internal openings in the body.

Correlative to pore size and multiplicity in any given porous electrode body is the porosity factor or value thereof. This may be expressed as the percentage by volume of void space in any given unit volume of the electrode body. The porosity, as is readily evident, is the difference upon subtraction from 100 volumetric % of the percentage of the actual or apparent density of any specific electrode mass from the theoretical solid density of the material of construction of the electrode. Porous electrode bodies fabricated in practice of the present invention can ordinarily range in porosity at values of from about 30 to about 90%. More commonly, the porosity is found to be on an order that is between about 60 and about 85%.

Along an associated line, it is also usually beneficial for the degree of porosity built into the electrode body product to be such that the total hole or open area on any given section of exposed surface of the structure provides an adequate proportion of the total area of that exposed surface so as to ensure satisfactory mass transfer effects and capabilities for adequate fluid ingress and egress with respect to the electrode body.

The material of construction utilized for the electrode body being made must, of course, be electroconductive and of sufficiently ductile character to allow compression thereof from the pre-form condition without undesirable internal collapse, excessive zone densification, breakage or fracture. It thus cannot be too brittle or susceptible to inability of satisfactory compressability characteristics and response. It should also have other good properties for its intended electrochemical utilization, such as adequate corrosion resistance and so forth.

Ordinarily, various metals may be suitably employed for this purpose, such as (and particularly) nickel, titanium, iron and various of the so-called corrosion-resisting or stainless steel alloys, copper and so forth. The electrode body materials should also have other good properties-for their intended electrochemical utilization.

Depending on the nature of the particular electrolyte(s) and opposite electrode, such as an anode, involved in a particular system in which the electrode is to be employed, the base material for the porous electrode bodies according to the present invention should be at least substantially if not completely resistant to chemical attach—at least during cell operation—by the contacting electrolyte material that is utilized and oxygen when the electrode is employed as an oxygen depolarized cathode.

Needless to mention and as is above indicated, it may be permissable in some instances and for some purposes to eliminate or treat as optional the pre-catalyzation of the pre-form if the material of its construction is of an inherently sufficient electrocatalystic nature to admit of or permit this. This may be possible in some cases for certain intended applications involving nickel bodies; and is definitely allowable in extreme or extraordinary purposes when for some highly specialized usage the cost is disregardable and the electrode body is made of such intrinsically electrocatalystic metals as gold, silver or other precious and semi-precious metals including others of the platinum group. This, however, is generally found to be rare and usually not done for obvious reasons.

Besides the above-mentioned and identified silver platings, there are a plentiful number of workable catalyst substances for various electrochemical reactions possible to achieve by use of catalyzed electrodes according to practice of the present invention. Besides silver, many other platinum group metals and many of their compounds and compositions, especially the oxides, generally are quite good electrochemical catalysts. Besides silver, platinum is another prominently good example of this, especially in its very finely divided form known as platinum black. Nonetheless, such materials as the phthalocyanines—especially those of cadmium, cobalt, manganese and nickel, for reasons of relative economy, excellent activity and great practicality of usage are frequently found to be desirable for catalytic usage. Many other knwon substances, such as various of the oxides of manganese (particularly manganese dioxide—$MnO_2$, manganous or manganic oxide—$Mn_3O_4$, also known as "hausmannite", and manganic sesquioxide—$Mn_2O_3$), tungsten carbide and the like, are analogously suitable for pre-catalyzation of the pre-form.

When the catalyst deposition is done by the electroplating of metallic substances (such as silver), normal plating bath solutions and practices can be employed for the purpose. However, to secure good plating results in the interstitial passageways with less exterior surface deposition, it is oftentimes desirable to use less than normal plating current densities in the operation. Thus, when silver is being electroplated out of a cyanide bath, it is frequently beneficial for the plating current density employed to be reduced and about 1/10th or so of that normally applied for usual silver platings.

Regardless and without any intent of needless limitation to the numerical parameters recited, it is generally requisite (even with highly active catalytic agents) for the deposit load level or effectively laid amount of catalyst provided in the final electrode body product to be at least about 0.005 milligram of catalyst per cubic centimeter of porous electrode body volume. Particularly to accomodate situations in which not outstandingly active catalysts are employed (whereby sheer relative quantity can compensate in net effectiveness and satisfaction for lower specific performance capability of the catalyst), maximum deposit loadings may be, on the weight of catalytic agent per unit volume of electrode body basis, as high as about 7.5 mg/cc. In many situations, however, suitable deposit loadings for many catalytic agents are in the range of between about 1 and about 2.5 mg/cc, with deposited quantities of catalytic agents generally being inversely proportional insofar as decreasing appropriate mass per unit electrode body volume is concerned to increasing relative catalyst activity.

Literally any desired configuration can be designed and accomodated in the porous electrodes of the present invention. Wall section size or area can pretty much be as desired for most practical purposes; and reduced thickness can be made suitable for given intended usages. It is ordinary practice to make the electrode body in a generally thin and flat rectangular or circular plaque form. Body thickness in such constructions may be varied in the overall between about 5 and 500 or more mils (ca. 1.25 millimeters and 1.3 or so centimeters). More often it is in the range, frequently occurring as a matter of choice or design, between about 10 and about 250 mils (ca. between about 2.5 millimeters and 0.6 centimeters). In many cases, an appropriate body thickness is found to be between about 15 and about 100 mils (ca. 3.75 and 125 millimeters).

EXEMPLIFICATION OF THE INVENTION

To demonstrate the advantageous practice of the present invention, a number of experiments were performed with various metal pre-forms and product porous electrode bodes. The testings done and results obtained were as in the following.

FIRST EXAMPLE

In order to evaluate an electrode, it is necessary to obtain a voltage-current curve at some temperature above ambient; and to be able to relate that curve to similar curves obtained for more or less known standard electrodes operating in a given cell.

A series of porous metal body samples for testing under electrochemical operation conditions (but not pressed or compacted in accordance with the present invention) were prepared by punching appropriate sized discs, then adding the catalyst either by electroplating (for the silver catalyzed specimens) or plasma spraying (for the tungsten carbide catalyzed specimens). The porous metal stock utilized included "FM 1028" as above described and "Dynalloy" (from FLUID DYNAMICS) which is porous "Type 304" stainless steel product obtainable with nominal pore sizes of 3, 6 and 11 microns. The silver content was normally equivalent to catalyst loadings of about 0.25 oz/ft$^2$ (ca. 7.84 mg/cm$^2$) of planar geometric exposed surface area or about 0.05 mg/cc of porous body volume.

Each of the porous body specimens was then mounted in a ⅜ inch (ca. 0.951 centimeter) stainless steel "Swagelock" type tube fitting with an epoxy cement so that the area available for contact with the electrolyte solution was a circle ⅜ inch in diameter (0.11 sq. in. or ca. 0.71 square centimeters). This tube fitting was attached to gas delivery tubes and connected as the cathode in a 2000 ml volume electrolytic cell assembly. The electrolyte at about 50° C. was 100 g/liter NaOH (2.5 M); the anode was platinum screen; and the voltage of the cathode was measured versus a Ag/AgCl reference electrode commercially obtained from BECKMAN INSTRUMENTS under the trademark "Lazaran". Voltage of the cathode versus Ag/AgCl was recorded against cell current with oxygen and nitrogen in turn supplied at about 2–5 psig.

Typical voltage-current curves obtained for the "FM 1208" (having the median pore size 21 microns), as were both untreated and catalyzed with tungsten carbide, are graphically shown in FIG. 6. A virtually identically analogous performance was experienced for the untreated electrode using both oxygen and nitrogen (which was expected due to the low catalytic activity of nickel for this electrode reaction at 50° C.). With tungsten carbide as catalyst, the performance was greatly improved on oxygen (improved performance generally being taken to mean higher current for a given voltage). The performance on nitrogen was apparently and by inadvertance somewhat improved, probably due to the effect of residual oxygen in the system (solutions were not de-aerated between runs). Similar results, as drawn out in FIG. 7 of the drawing, were experienced with silver-catalyzed but unpressed "FM 1208".

These guide data provide a good basis of comparison for the results obtained in subsequent experimentations. It is worthy of note that in the described tests with the porous body electrodes employed, the gas bubbled through freely, even at low (<1 psig) pressures. For practical electrodes, a lower oxygen consumption must be obtained, either by recycling the oxygen or by making the electrode more efficient. Recycling requires necessary use of considerable ancillary equipment with a chance of hydrogen contamination in case of cell disruption.

SECOND EXAMPLE

The procedure of the First Example was repeated with 50° C. cell temperatures on another unpressed sample of "FM 1208" electroplated to the approximate 0.25 oz/ft$^2$ catalyst loading and three separate specimens that had different pore sizes and which were similarly electroplated; these having been "Dynalloy" bodies (namely "X3" of 3 micron size, "X6" of 6 micron size and "X11" sized at 11 microns). In addition to these and for comparison in order to show advantages obtained by practice of the present invention, four plated, pressed samples of the "FM 1208" compacted, respectively, under: 10,000; 12,500; 40,000; and 70,000 psi under a hydraulic ram were also made and tested. The results were as are set forth in the graphical presentations of the accompanying FIGS. 8 and 9 of the drawing. The curves in FIG. 8 for "Dynalloy" and the curve for unpressed "FM 1208" in FIG. 9 show that in this range the smaller pore size results in better performance. Note that very fine pore size, as with "Dynalloy X3", provided an electrode that operated with minimized voltage requirements.

THIRD EXAMPLE

Another series of electrode samples both unpressed and pressed were prepared from "Feltmetal FM 1028", the base stock of which consisted of sintered nickel fibers, with a nominal pore size of 24 microns. Discs with a diameter of 2.5 inches (ca. 6.35 centimeters) were plated on one side using a conventional silver cyanide (AgCN) plating solution at a current density of about 10 amps/ft$^2$ (ca. 10.73 milliamperes per square centimeter). The silver (Ag) loading was equivalent to 0.25 oz/ft$^2$ of geometric area. Electrode "A" was not pressed; Electrode "B" was pressed at 14,000 psi; and Electrode "C" was pressed at 24,000 psi. Their respective thicknesses were: for "A"—50 mils (ca. 0.127 cm); for "B"—34 mils (ca. 0.0864 cm); and for "C"—29 mils (ca. 0.0737 cm). Each electrode was then epoxy cemented to an acrylic plastic frame, which left an effective electrode area of 3 square inches (ca. 19.35 square centimeters).

Each of these electrodes was then individually and sequentially assembled into electrolytic cells that had an expanded titanium mesh anode, coated with a layer of an oxide containing titanium and ruthenium, spaced apart from an oxygen gas depolarized cathode by a duPont "Nafion 12V6Cl" cation exchange membrane which was operated to produce chlorine gas at the anode and sodium hydroxide in the cathode compartment. Each electrode had a geometric surface area of 3 square inches (ca. 19.35 square centimeters).

With a low direct current of 0.5 amp/in$^2$ (ca. 0.77 ma/cm$^2$) applied across the anode and cathode, an aqueous sodium chloride brine was circulated through the anode compartment, with sodium chloride additions for composition control. A sodium hydroxide-containing catholyte was circulated, with water additions for composition control. Oxygen or nitrogen gas (depending on whether an active or inactive cathode was wanted) was pumped through a gas compartment on one side of the cathode which separated the gas compartment from catholyte. Saturated NaCl brine was used as anolyte and 100 g/l NaOH as catholyte. The anolyte concentration was maintained by means of an overflow arrangement, while the catholyte used an overflow with a metered water feed. Catholyte depth or head was about 6 inches (ca. 15.24 cm). Gas flow rate was about 100 ml/min. The whole cell assembly was placed in a box held at 70° C. Except when generating voltage-current curves, the cells were operated at a constant current density of 0.5 amp/in$^2$.

Figure 10:
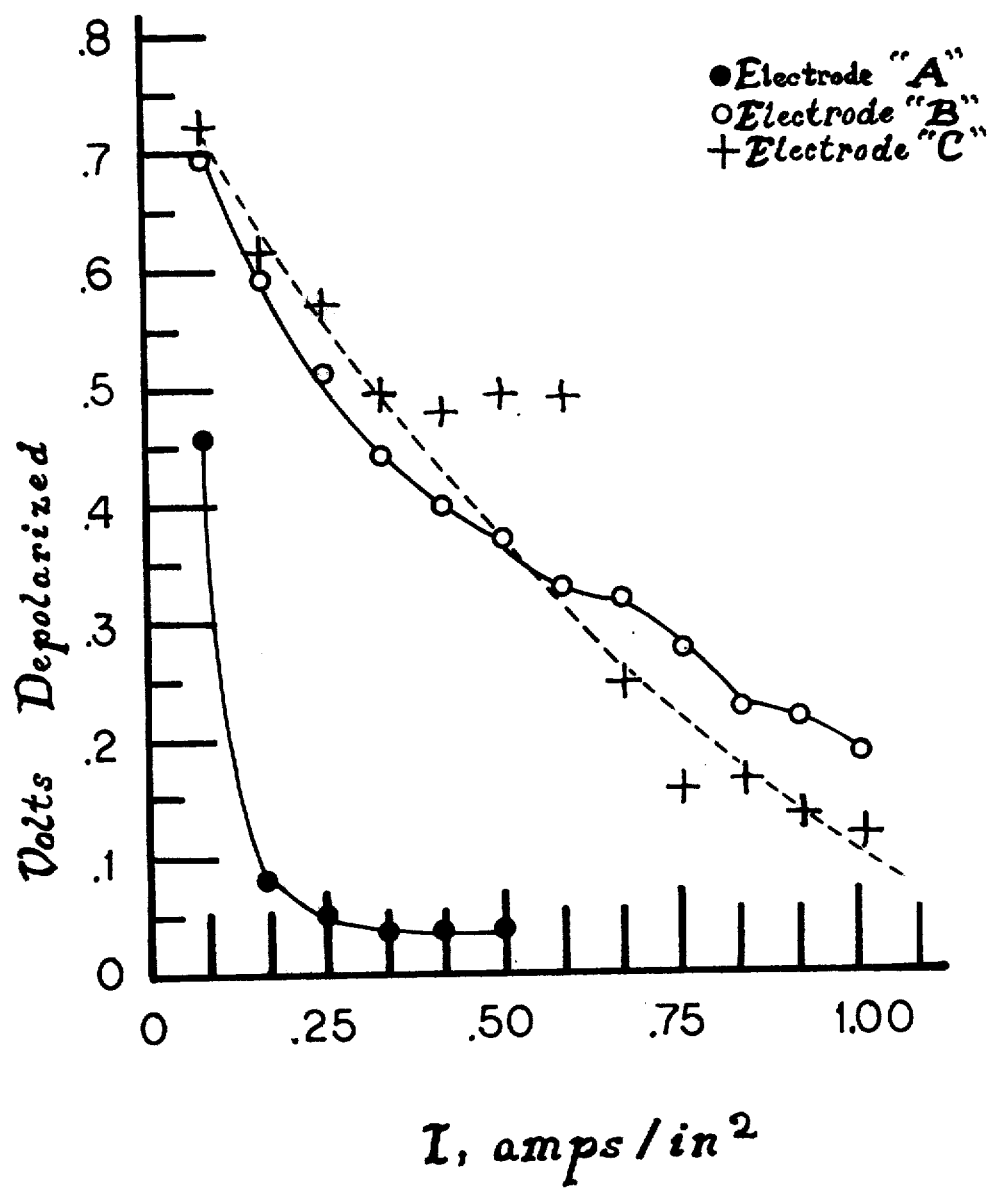
Figure 11:
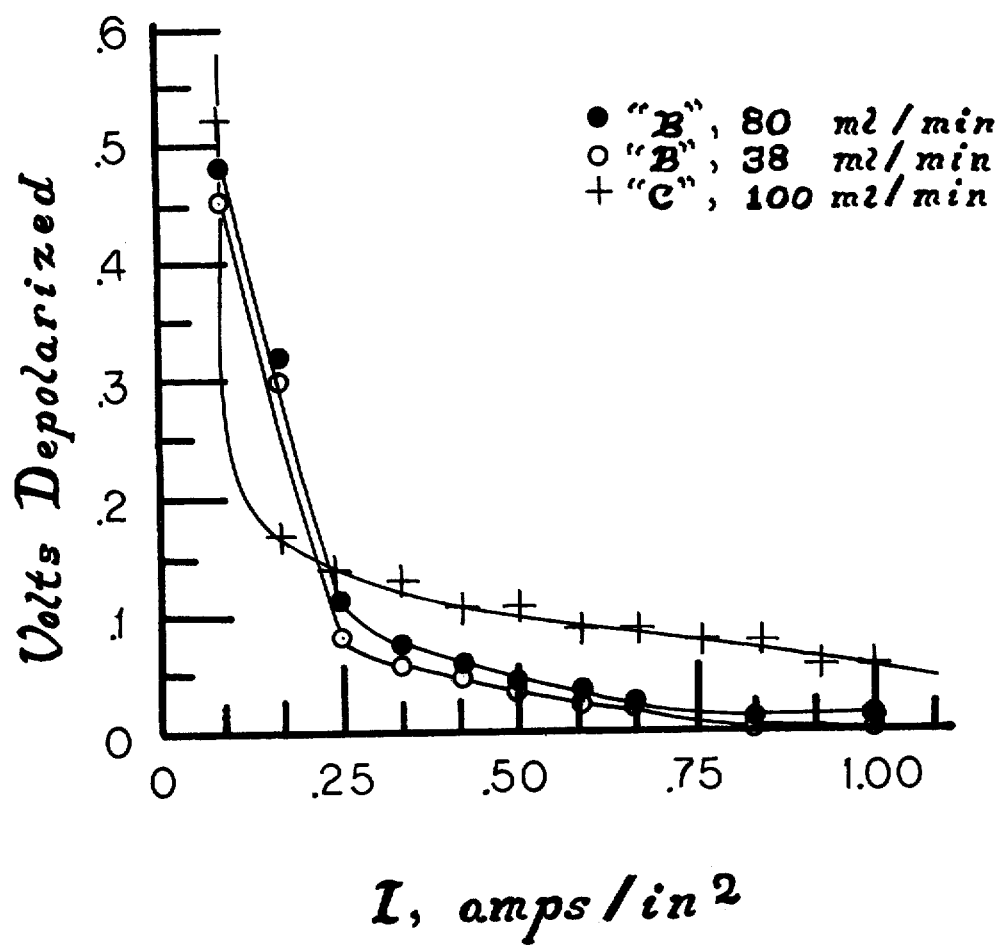

FIG. 10, in graphical portrayal, shows the relationship between current density and "depolarization" obtained for the three electrodes. This depolarization is, for present purposes, defined as the difference in cell voltage when the cathode is run on oxygen (or air) and nitrogen. Using oxygen, the cathode reaction is according to the Equation:

$$O_2 + 2H_2O + 4e \rightarrow 4OH^-, \qquad (IX)$$

whereas, when the cathode is supplied with nitrogen, the Equation for the reaction becomes

$$H_2O + e \rightarrow \tfrac{1}{2}H_2 + OH^-, \qquad (X)$$

it being, in other words, equivalent to the cathode reaction in a standard chlor-alkali cell. Thus the cell voltage on nitrogen and with considerable reliability may be regarded as an equivalent to a standard chlor-alkali cell voltage. It is significant in this to bear in mind that differences in hydrogen overvoltage between silver and mild steel are generally relatively small at these current densities.

One of the problems that was observed in association with very small pore size electrodes was a slow voltage response to changing current. Thus, for Electrode "C", the voltage almost invariably took up to several hours to stabilize at each current setting. Presumably this was the reason for some of the scattered data points; since over the 80-plus day run of Electrode "C", depolarization was between 0.4–0.45 volts at 0.5 amps/in$^2$ which placed it more in line with the rest of the data brought forth in FIG. 10.

The poor performance of Electrode "A" was analytically attributable to the relative large size of its pores (24 microns). With such pore size, the resistance of the electrode to gas transmission was so low that, at the low gas rates used, the oxygen pressure in the pores was low, probably not having been more than the approximate 6-inch catholyte head. Thus, there was insufficient oxygen transfer to the electrode surface to sustain much current flow at low overvoltage. This effect will be more fully elucidated below.

The smaller pore size of Electrodes "B" and "C" resulted in higher oxygen pressures in the pores, and greatly improved performance. Note that, both on oxygen and air (FIG. 11), the performance of Electrode "C" fell off relative to "B" as the current density was increased. This is attributed to the fact that Electrode "C" had a smaller available surface area than "B". That is, the higher pressure used for fabricating "C" apparently totally collapsed some of the interior pore structure, reducing the effective available surface area.

Further evidence of the effects of lack of sufficient catalyst-bearing surface area within an electrode body was developed by running Electrode "B" with varying oxygen flow rates. The results obtained were as depicted graphically in FIG. 12. This has definite bearing on the desideration of having as much cathode depolarization with as little cell current as possible. It is clearly demonstrated by the relative insensitivity of Electrode "B" to oxygen flow rates about 28 ml/min. as shown in FIG. 12.

Bearing in mind that when those electrodes operate with gas bubbling through them, it is apparent that the major effect of increased oxygen flow rate is to increase the oxygen pressure in the pores. An increase in oxygen pressure results not only in an increase in the mass transfer rate of oxygen to the surface, but also in increase in the number of small pores utilized.

The reasons for this are per the explanations set forth in the "DISSERTATION..." of the foregoing specification.

The beneficial results obtained in practice of the present invention are clear from study of and reflection on the foregoing.

At least equivalent good results are realized when any or all of the foregoing is analogously reproduced using other and different fine pore size-containing catalyzed electrode bodies (such as those from platinum black, and so forth) fabricated in accordance herewith.

Comparable excellent and likewise surprisingly good results are also obtainable with the same and similarly catalyzed porous electrode bodies when employed in other electroreduction systems and for other electrochemical purposes (including synthesis reactions and so forth) or when utilized in the galvanic mode, as in fuel cells with an aqueous sodium hydroxide catholyte therein.

Many changes and modifications can readily be made and adapted in embodiments in accordance with the present invention without substantially departing from its apparent and intended spirit and scope, all in pursuance and accordance with same as it is set forth and defined in the hereto appended claims.

What is claimed is:

1. Technique for the fabrication of a catalyzed porous electrode body that is copiously laced with a great multiplicity of body-traversing, internal pores having fine size pore measurements on the order of average nominal diameter or equivalent measure between about 0.1 and about 12 microns and a porosity of between about 30 and about 90 volume percent, based on the percentage of porulous void space in the total volume of the electrode body, said technique comprising
    taking as a pre-form a porous body of ductile, compressible, electroconductive material of construction having therein a plurality of interstitial precursor passageways that have a nominal average passageway diameter or equivalent measure greater than about 12 microns;
    then subjecting said pre-form to pressure adequate to densify same and reduce the size of said precursor passageways to an average nominal diameter or equivalent measure that is less than about 12 microns.

2. The technique of claim 1 and including, in addition thereto and in combination therewith:
    the preliminary step of depositing an electrocatalytic agent substance in effective laid quantities on the interior wall surfaces of said precursor interstitial passageways of said pre-form prior to subjecting said pre-form to compacting pressure.

3. A technique in accordance with the technique of claim 2, wherein the said size of said precursor passageways is between about 20 and about 100 microns.

4. A technique in accordance with the technique of claim 2, wherein said material of construction is comprised of a metal selected from the group consisting of nickel, iron, stainless steel alloys, copper and titanium.

5. A technique in accordance with the technique of claim 2, wherein said material of construction is nickel.

6. A technique in accordance with the technique of claim 2, wherein the deposition of the electrocatalytic agent is done by silver plating.

7. A technique in accordance with the technique of claim 2, wherein the deposition of the electrocatalytic agent is done by a coating application of a catalytically-active substance.

8. A technique in accordance with the technique of claim 2, wherein said pre-form is a relatively flat body which is subject to pressure in a face-to-face direction across its thickness.

9. A technique in accordance with the technique of claim 2, wherein said pre-form is a flat, sheet-like body which is subjected to squeezing pressure by passage between the nip of at least one stand of a compacting roller arrangement.

10. A technique in accordance with the technique of claim 2, wherein said pre-form is subjected to enough pressure to reduce its face-to-face thickness by between about 20 and about 70 percent in measure.

11. A technique in accordance with the technique of claim 2, wherein said pre-form is subjected to enough pressure to reduce its face-to-face thickness by between about 30 and about 60 percent in measure.

12. A catalyzed porous electrode body having a structure comprising:
    an electroconductive material of construction shaped into electrode body form;
    said electrode body form containing a great multiplicity of fine pores traversing said body that have an average nominal diameter size or equivalent measure of between about 0.1 and 12 microns;
    said electrode body form also having a porosity of between about 30 and about 90 volume percent, based on the volume of porulous void space in the total volume of the electrode body;
    said body being further characterizable as the physically compressed and densified remains of a porous pre-form of a preliminary body of the same material of construction copiously laced with interstitial passageways that were precursors of said fine pores and which had an average nominal diameter or equivalent measure in excess of about 12 microns.

13. The electrode body of claim 12 and including, in addition thereto and in combination therewith,
    a deposit in effective quantity of an electrocatalytically-active substance laid on the interior wall surfaces of said fine pores.

14. An electrode body in accordance with that of claim 13, wherein
    said fine pores have an average size between about 3 and about 8 microns.

15. An electrode body in accordance with that of claim 13, wherein
    the porosity of said electrode body is between about 30 and about 90 percent.

16. An electrode body in accordance with that of claim 13, wherein said material of construction is comprised of a ductile metal selected from the group consisting of nickel, iron, stainless steel alloys, copper and titanium.

17. An electrode body in accordance with that of claim 13, wherein
said material of construction is nickel.

18. An electrode body in accordance with that of claim 13, wherein
said electrocatalytically-active deposit is silver.

19. An electrode body in accordance with that of claim 13, wherein
said electrocatalytically-active deposit is in an application load level laid down in a quantity of between about 0.005 and 7.5 milligrams of catalyst per cubic centimeter of porous electrode body volume.

20. An electrode body in accordance with that of claim 13, wherein
said electrocatalytically-active deposit is in an application load level laid down in a quantity of between about 1 and 2.5 milligrams of catalyst per cubic centimeter of porous electrode body volume.

21. An electrode body in accordance with that of claim 13, wherein
the thickness of said electrode body is between about 5 and about 500 mils.

22. An electrode body in accordance with that of claim 13, wherein
the thickness of said electrode body is between about 15 and about 100 mils.

* * * * *